United States Patent
Lei et al.

(10) Patent No.: US 12,185,204 B2
(45) Date of Patent: Dec. 31, 2024

(54) METHODS AND APPARATUSES FOR OTA BROADCAST EFFICIENCY

(71) Applicant: FORD GLOBAL TECHNOLOGIES, LLC, Dearborn, MI (US)

(72) Inventors: Oliver Lei, Windsor (CA); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 17/865,826

(22) Filed: Jul. 15, 2022

(65) Prior Publication Data

US 2024/0022883 A1    Jan. 18, 2024

(51) Int. Cl.
| | |
|---|---|
| H04W 4/44 | (2018.01) |
| H04L 67/00 | (2022.01) |
| H04W 4/021 | (2018.01) |
| H04W 72/30 | (2023.01) |

(52) U.S. Cl.
CPC .............. *H04W 4/44* (2018.02); *H04L 67/34* (2013.01); *H04W 4/021* (2013.01); *H04W 72/30* (2023.01)

(58) Field of Classification Search
CPC ........ H04L 67/34; H04W 4/021; H04W 4/44; H04W 72/30
See application file for complete search history.

(56) References Cited

U.S. PATENT DOCUMENTS

| | | | |
|---|---|---|---|
| 9,819,726 B2 | 11/2017 | Pazos et al. | |
| 11,206,513 B1* | 12/2021 | John | H04W 4/06 |
| 2008/0032685 A1 | 2/2008 | Talty et al. | |
| 2015/0339114 A1* | 11/2015 | Rockwell | G06F 8/65 |
| | | | 701/1 |
| 2017/0353350 A1* | 12/2017 | Gussen | H04B 10/116 |
| 2020/0125355 A1* | 4/2020 | Aust | H04W 4/44 |
| 2021/0225092 A1 | 7/2021 | Lei | |

* cited by examiner

*Primary Examiner* — Nguyen T Vo
(74) *Attorney, Agent, or Firm* — Joseph Zane; Brooks Kushman P.C.

(57) ABSTRACT

A system broadcasts a vehicle state query to a plurality of vehicles within an ATSC broadcast radius at a plurality of different time windows. The system receives responses to the state query indicating at least vehicle motion data. The system aggregates the data to determine time windows when vehicles are present within the broadcast radius and are not stationary when vehicles are present within the broadcast radius and are stationary. Further, the system determines time windows projected to result in completed delivery above a predefined threshold percentage of a vehicle software update designated for broadcast, chosen for delivering the update to the threshold percentage as quickly as possible with higher data rate transmission relative to other time windows. The system automatically instructs an ATSC transmission point to broadcast the vehicle software update during the determined time windows.

20 Claims, 2 Drawing Sheets

METHODS AND APPARATUSES FOR OTA BROADCAST EFFICIENCY

TECHNICAL FIELD

The illustrative embodiments relate to methods and apparatuses for OTA broadcast efficiency.

BACKGROUND

With the massive amount of hardware, software and firmware contained within many modern vehicles, keeping vehicles updated with current changes can be an ongoing task. Various changes to technology and upgrades to software and vehicle systems interactions often entail updates to one or more pieces of software or firmware. These updates may occur across thousands or tens of thousands of vehicles.

Over the Air (OTA) software updates have been one of the preferred solutions for delivering such updates. While past updates used to require having a customer download an update to a memory stick and insert the stick in a vehicle, or drive the vehicle to a dealer for update, OTA updates allow for on-demand updates at least at certain vehicles states, and rapid deployment of large volumes of updates without overwhelming a network of dealers.

Cellular technology is often used to deliver these updates, as it provides a direct link to a vehicle so the vehicle can be specifically updated based on its own specific configuration. This one-to-one approach provides the advantage of knowing exactly what vehicles were updated with which software at what times, as well as ensuring completeness of transmission based on feedback from the vehicle being updated. The expense involved in using cellular bandwidth to perform these updates, however, when considered across the millions of vehicles on the road, can be massive. Further, such expense may only increase as the complexity and volume of onboard updatable system grows as vehicles increase in computing technology. Additionally, if user phones are used to deliver the updates through a BLUETOOTH connection to the vehicle leveraging the user's data plan, users may not want their data being used in this manner (even though they are the ultimate beneficiaries of the updates). This would represent more of an issue if and when the volume of updates uses a significant portion of user-allocated data for a time period.

SUMMARY

In a first illustrative embodiment, a system includes one or more processors configured to broadcast a vehicle state query to a plurality of vehicles within an ATSC broadcast radius associated with an ATSC transmission point, at a plurality of different time windows over a plurality of days. The one or more processors are also configured to receive responses to the state query indicating vehicle state data, including at least vehicle motion data. The processors are additionally configured to aggregate the data to determine a first plurality of the time windows when a predefined threshold number of vehicles are present within the broadcast radius and are not stationary for at least a predetermined contiguous amount of time during a given time window of the first plurality and aggregate the data to determine a second plurality of the time windows when a predefined threshold number of vehicles are present within the broadcast radius and are stationary for at least a predetermined contiguous amount of time during a given time window of the second plurality. Further, the one or more processors are configured to determine ones of the first plurality and second plurality of time windows projected to result in completed delivery above a predefined threshold percentage of a vehicle software update designated for broadcast, the ones chosen for delivering the update to the threshold percentage as quickly as possible with higher data rate transmission relative to other ones of the first plurality and second plurality of time windows and automatically instruct the ATSC transmission point to broadcast the vehicle software update during the determined ones of the first and second plurality of time windows.

In a second illustrative embodiment, a method includes broadcasting a vehicle state query to a plurality of vehicles within an ATSC broadcast radius associated with an ATSC transmission point, at a plurality of different time windows over a plurality of days. The method also includes receiving responses to the state query indicating vehicle state data, including at least vehicle motion data, aggregating the data to determine a first plurality of the time windows when a predefined threshold number of vehicles are present within the broadcast radius and are not stationary for at least a predetermined contiguous amount of time during a given time window of the first plurality and aggregating the data to determine a second plurality of the time windows when a predefined threshold number of vehicles are present within the broadcast radius and are stationary for at least a predetermined contiguous amount of time during a given time window of the second plurality. Further, the method includes determining ones of the first plurality and second plurality of time windows projected to result in completed delivery above a predefined threshold percentage of a vehicle software update designated for broadcast, the ones chosen for delivering the update to the threshold percentage as quickly as possible with higher data rate transmission relative to other ones of the first plurality and second plurality of time windows. The method additionally includes automatically instructing the ATSC transmission point to broadcast the vehicle software update during the determined ones of the first and second plurality of time windows.

In a third illustrative embodiment, a system includes one or more processors configured to broadcast a vehicle state query to a plurality of vehicles, for which a vehicle software update, designated for ATSC broadcast, applies, the plurality of vehicles within an ATSC broadcast radius associated with an ATSC transmission point, the vehicle state query broadcast at a plurality of different time windows over a plurality of days. The one or more processors are also configured to receive responses to the state query indicating vehicle state data, including at least vehicle motion data, aggregate the data to determine a first plurality of the time windows when a predefined threshold number of vehicles are present within the broadcast radius and are not stationary for at least a predetermined contiguous amount of time during a given time window of the first plurality and aggregate the data to determine a second plurality of the time windows when a predefined threshold number of vehicles are present within the broadcast radius and are stationary for at least a predetermined contiguous amount of time during a given time window of the second plurality. The one or more processors are additionally configured to determine ones of the first plurality and second plurality of time windows projected to result in completed delivery above a predefined threshold percentage of the vehicle software update, the ones chosen for delivering the update to the threshold percentage as quickly as possible with higher data rate transmission relative to other ones of the first plurality and second plurality of time windows. Also, the one or more processors are configured to automatically instruct the ATSC transmission point to broadcast the vehicle software update during the determined ones of the first and second plurality of time windows.

DETAILED DESCRIPTION

Figure 1:
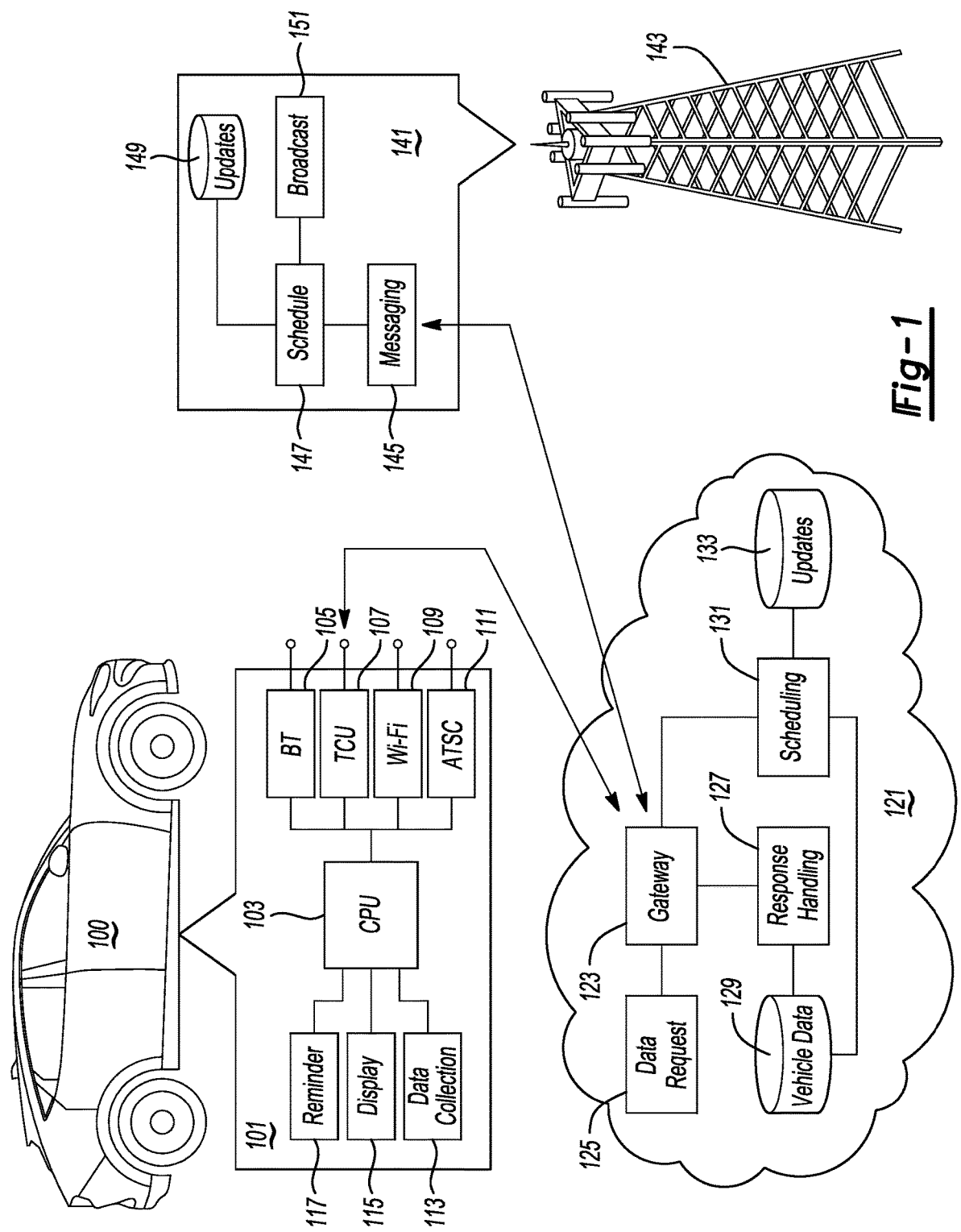
FIG. 1 shows an illustrative example of an ATSC OTA update system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Broadcast technology has been proposed to be used for OTA updates. One example of this is Advanced Television Systems Committee (ATSC) broadcasting. Broadcasts can be used to deliver data packets, which can include software updates, at high rates of speed to many vehicles at the same time. This is not a one-to-one approach, but a one-to-many, where packets can be designated for certain vehicle parameters, and non-applicable vehicles can simply disregard or discard the broadcast packets.

Of course, with such broadcasts, there is no direct two-way communication established with each vehicle, so assurances about completeness of updates and whether any given vehicle received an update are changed. But, vehicles can use cellular and wireless connections (e.g., Wi-Fi) to obtain additional missing packets. Certain vehicles, which may miss an ATSC update entirely, could even be updated in the cellular OTA manner, but at least with the proposed model, a large portion of the files for the update can be delivered to a large segment of the vehicle population without the overhead associated with one-to-one transmission to each vehicle.

Using ATSC broadcasting is not free, however, and so when to use the broadcast, and which type of transmission to use, still requires planning and care. ATSC devices can receive multiple useable physical layer pipes (PLPs) using different protocols. Some may be suitable for higher speed transmission to fixed objects (e.g., vehicles at rest), others may be suitable for lower speed transmission to moving targets (e.g., vehicles in motion). Knowing the dynamics of the receiving audience in this case is useful, and not a problem commonly encountered when broadcasting to essentially stationary devices such as antenna and set-top boxes.

Configuring ATSC is often a tradeoff, wherein higher speed payloads can be traded for higher signal robustness. In the context of stationary targets versus moving targets, it may be useful to delivery higher speed payload lower robustness signals to stationary targets and lower speed payload higher robustness signals to moving targets.

Since there is rarely, if ever, a time when all vehicles are either singularly stationary or moving within a broadcast range, which can extend for 60+ miles around a broadcast point, there is rarely a single plan strategy that will accomplish adequate delivery to all vehicles at one time in a most-efficient manner. That is, if the broadcast is designed for stationary vehicles with a high speed payload and low robustness signal, then moving vehicles will drop many packets if trying to receive the broadcast. Using a lower payload, more robust signal may delivery adequate payloads to both stationary and moving vehicles, but it may require significantly longer usage of the ATSC transmitter due to the lower volume of data throughput.

The illustrative embodiments propose dynamic and adaptive scheduling and planning of ATSC OTA broadcasts that are tunable and reactive to vehicle behavior within a broadcast region, allowing for efficient planning of OTA broadcast timing and type, to increase overall delivery of updates in an efficient and effective manner that limits usage of one-to-one communication for updates.

FIG. 1 shows an illustrative example of an ATSC OTA update system. In this example, a vehicle 100 includes an onboard computing system 101. This computing system can have hundreds of systems and components, and the shown examples are illustrative only. The vehicle system 101 includes one or more processors 103, as well as communication transceivers. These can include BLUETOOTH transceiver 105, a telematics control unit (TCU) 107 usable for long range cellular communication, a Wi-Fi transceiver 109, etc.

Also, in this example, the vehicle 100 includes an ATSC receiver 111 that can receive ATSC broadcasts. As previously mentioned, the pertinence and applicability of a given broadcast packet to a given vehicle can be determined based on information included in the broadcast. The vehicle 100 can analyze a received packet and store it locally for update usage when it applies to that vehicle (e.g., based on a corresponding identifier, such as make, model, system ID, etc., included in the packet) and otherwise disregard or discard the packet.

Also, in this example, vehicle data, including, for example, speed, location, duration of current state, software versions, modes, model year, model, trim level, etc., is provided in response to a query, and the data gathering process 113 can collect the relevant data and report the data to a server. It is possible for the data gathering process to queue a volume of data for reporting, so that, for example, if the queries are at one-hour intervals, the vehicle 100 is capable of reporting state data for the entire preceding hour, so that if the vehicle happens to be moving, but was not moving for most of the time period in question, the server issuing the query will get a more complete image of the vehicle. Additionally or alternatively, the data gathering report can be issued at time X with coverage duration Y, and the vehicle 100 can report back at time X+Y with information relating to vehicle state changes over the relevant time period. The reported states can include any states considered pertinent to determinations needed to be made about the schedule of and nature of any planned ATSC broadcasts. This can also include, for example, current software versions, which may be relevant because if most of the vehicles in a region already have an updated software version planned for broadcast, the broadcast can be foregone in lieu of simply using one-to-one communication with vehicles indicating an older version, as that may be more efficient and effective.

A vehicle display 115 may be used to present information pertaining to planned ATSC broadcasts, such as proposed broadcast timeslots and/or reminders about upcoming broadcasts, along with required vehicle states if the broadcast is to be effectively received. A reminder process can track data relating to planned broadcasts, received from the cloud 121 scheduler 131, and push reminders to the display when they are relevant to that vehicle (e.g., an applicable update in an upcoming timeslot).

The cloud can include a plurality of backend servers, such as those provided by an original equipment manufacturer (OEM). A gateway process 123 can handle communication incoming and outgoing, which in this example can include queries to vehicles, scheduling reminders to vehicles, data polling to vehicles, data polling responses, scheduling and data to the ATSC transmitting station, etc. The gateway will route appropriate requests to the appropriate backend systems and/or recipient systems.

A data request 125 may be issued periodically to plan updates, and may be issued each time there is an update planned, to build a profile of the particular vehicles to which the update applies. For example, if vehicle locations are known or generally known, all vehicles in region X, where region X is a known broadcast reception range for an ATSC transmitter 143, may be polled for current state data and persistent data characteristics (e.g., model, year, etc.).

A sort may occur at the vehicle 100 or at the server, that is, the vehicle 100 may elect not to respond to a given request, or the server may only send requests to certain vehicles having certain characteristics. Additionally or alternatively, the ATSC transmitter may broadcast such requests, if more efficient, and any vehicle capable of receiving and handling the request may activate the data gathering process responsive to the request and send a response to the response handling process 127, which can store gathered vehicle data in a data repository 129.

Depending on the nature of updates, it may be more effective to plan a general strategy based on all vehicle movement, or a strategy based on particular vehicle movement. For example, if the update is applicable to vehicles commonly driven in certain conditions, and not commonly used as commuting vehicles, the process may issue new data gathering to confirm that most of these vehicles are at rest at most times. These could include, for example, very expensive sports cars or luxury vehicles that tend to experience less day-to-day usage. Other updates may be more broadly applicable, and so it can also be useful to know, and periodically confirm, travel habits of generally all vehicles within a broadcast region. Different polling, as described above, can be done based on the type of update to be delivered, its applicability, and whether a recent applicable travel-habit and data profile for the relevant vehicles has been built or confirmed by the backend.

A scheduling process 131 may access the vehicle data repository 129 and an update repository 133 to schedule update broadcasts. Based on the desired coverage and nature of recipient vehicles as indicated by their travel habits and data responses stored in the data repository, the scheduler can determine suitable broadcast types (e.g. configurations of the ATSC broadcast) and times of day/days of week for broadcast. The scheduler can then send the schedule to both the ATSC station 141, as well as any relevant vehicles 100 for storage as a reminder and a presentation to the occupants. Direct polling about preferred broadcast timeslots from a subset, i.e., a selectable list of choices of planned broadcasts, may also be used to gather general interest and for indicating when a given vehicle is to be updated based on driver preference.

The ATSC station may include a server system 141 with a messaging process 145 for receiving broadcast parameters and data sets to be broadcast from the remote OEM servers in the cloud 121. This can be passed to a scheduling process 147, which can store the relevant data in an updates repository 149 until a scheduled broadcast. The scheduling process can then configure the broadcast according to parameters received with the scheduling and deliver the corresponding update packets for broadcast to a broadcast process 151, which uses the ATSC transmitter 143 to broadcast the update over the reception range.

Figure 2:
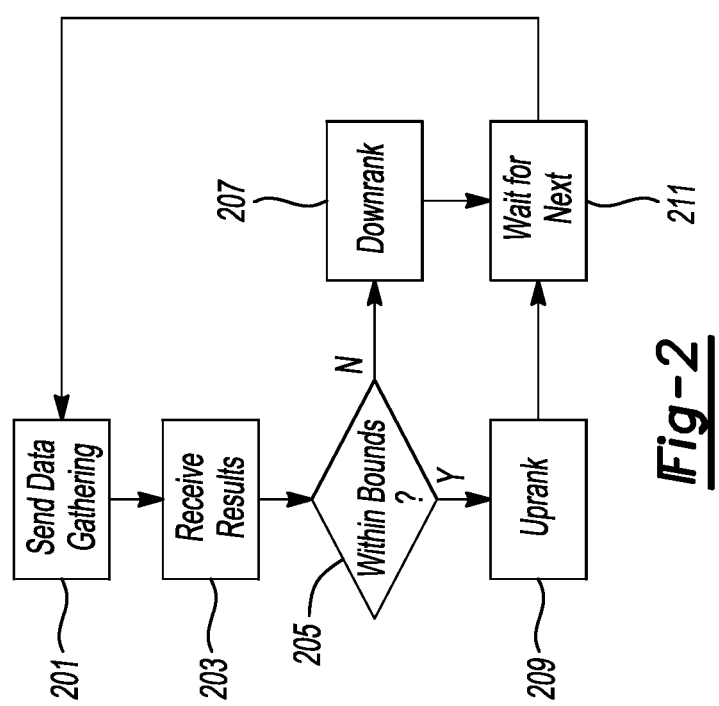
FIG. 2 shows an illustrative example of a vehicle polling process and scheduling process.

FIG. 2 shows an illustrative example of a vehicle polling process and scheduling process. In this example, the process sends a data gathering request at 201. This can be sent to vehicles 100 via an ATSC broadcast at one or more intervals. The process can start with a wake-up message to ATSC receivers in vehicles. This is preferred as the vehicle may be off and the ATSC receiver is in sleep mode and can wake up and then process the request.

If vehicles are preconfigured with response software, then a direct request to the vehicles may be efficient in a small packet size, which is essentially a trigger for the already onboard software to respond, and which can include any variables pertinent to the query—such as a query directed at finding out which vehicles of a certain type or having a certain system are within the region.

The process may receive responses from the vehicles via telematics control unit (TCU) equipped at 203, and for each response, determine whether the vehicle data profile places it within bounds of a proposed ATSC broadcast configuration at 205. This can be done for multiple configurations at once—e.g., for a given vehicle, does the update apply and/or does the movement profile indicate it would be suitable for a given broadcast type. Each configuration applicable to that timeslot can then be upranked at 209 or downranked at 207 relative to other timeslots based on suitability for reaching that vehicle during that timeslot. Since specific vehicle identifying data may not be received, in essence this may amount to something akin to a relativistic count of suitability in a given timeslot, usable to determine which types of broadcast can be used in the timeslot to successfully update a certain percentage of vehicles, and which timeslots are the best time slots for such broadcast types. This process can occur as the data is received from each vehicle responding and wait for additional data at 211, or can occur after most vehicles are believed to have responded.

Direct customer feedback may also be useful, which can include sending proposed timeslots and required vehicle states during those timeslots, and the customer can indicate a preference, which can be used to plan updates for the group. Customers may generally know when their vehicles are not moving, although they often do not know exactly when their vehicles are moving and/or the nature or version of currently installed updates and other values that may be returned from a direct vehicle query.

Retroactive analysis, by examining which vehicles actually received an update based either on reporting and/or which vehicles request an update, can also help modify a future schedule. If an update was predicted to reach 80 percent of vehicles in a region, and 40 percent of the vehicles requested a full or partial one-to-one update, then the projection was wrong, or the vehicles behaved anomalously, or the process did not account for a large number of vehicles within the region for some reason. To the extent a vehicle stores past travel data, the server can poll the vehicle directly when the update is directly requested, to find out what the vehicle was doing when the update that should have reached the vehicle was broadcast. This can help determine a flaw in the scheduling process for that region, which can be addressed in future planning.

For example, by examining causes of non-reception (e.g., a vehicle was in motion when projected to be still, or a vehicle was outside of the broadcast region or otherwise unreachable by the broadcast), an assessment process used to determine the likelihood of delivery can be modified to better account for a likelihood of vehicles being in motion or unreachable. If, for example, vehicles generally behaved as expected at 3 AM, then the process may conclude that this evaluation is suitable for that timeslot. But if vehicles showed greater variance in motion between 12 and 2 pm, the process may conclude that predictions for motion during those timeslots should be increased, and this may diminish the likelihood of that timeslot being chosen for a PLP1 broadcast. Vehicles receiving the broadcast may also report state data upon reception, so the process can determine, for example, whether more vehicles were stationary and/or available than predicted, and can correspondingly modify the likelihood of stationary vehicles under certain conditions and/or in certain time windows.

Figure 3:
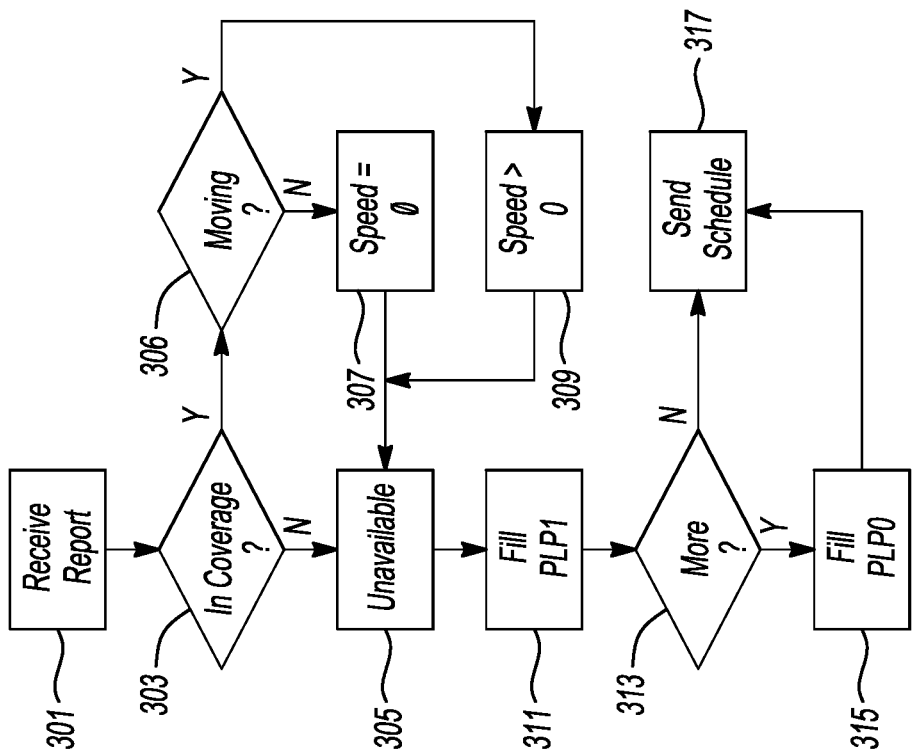
FIG. 3 shows an illustrative example of a vehicle data evaluation process.

FIG. 3 shows an illustrative example of a vehicle data evaluation process. In this example, vehicle data is received at 301 and the process determines if the vehicle was in the broadcast range for a suitable amount of time during the desired reporting period at 303. That is, if the query was based on an instant vehicle location of the desired reporting period (after a period of time when the query was sent) (such as an ATSC broadcast), the vehicle may have headed out of the reception region and may have remained there for hours, or at least any relevant reporting period. Thus, for planning purposes, it may be reasonable to conclude that at least this vehicle would be typically unavailable during that timeslot at 305.

If the vehicle 100 were within the range for suitable duration (which may simply be instantaneous location, if that is the nature of the query) at 303, the process could determine if the vehicle were in motion at 306. Again, motion can be instantaneous evaluation or evaluation of a motion profile over a time period. Whether the vehicle 100 is considered moving or not moving may be a function of whether the vehicle was ever at rest for sufficient duration to receive a high payload lower robustness broadcast.

If the vehicle 100 was not suitably at rest at 306, the process could log that vehicle as having a speed over rest at 309. Otherwise, the vehicle could be indicated as resting at 307. If broadcasting is heavily used by many participants, the OEM may only be able to predict a timeslot during which broadcast will occur, without knowing exactly when in that timeslot the broadcast will occur, and may require a statistical likelihood of each vehicle being moving or resting based on indicated values, duration of broadcast, which may be short, and required contiguous resting state during the duration of the broadcast (which may be equal to the duration of the broadcast). If the broadcast persisted for the whole duration of the relevant time period, e.g., a 60 minute broadcast requiring the vehicle only to be resting for 3 minutes contiguously, the server can assign a likelihood of the vehicle being in the required state at some point during the window.

Once sufficient vehicles have reported data, the process can fill a PLP1 timeslot or slots at 311, which in this example is usable for stationary vehicles and transmits significant data in a limited window with limited robustness. If there are simply too many moving vehicles within an area to have assurances that PLP1, even with multiple broadcasts, will reach sufficient vehicles to achieve a desired saturation at 313, the process may then schedule one or more PLP0 broadcasts, which take longer due to a lesser payload, but which have sufficient robustness to be received by moving vehicles.

For example, in a busy city, many vehicles may be garaged at night, placing them out of range of an ATSC broadcast due to propagation blockage in deep garages. At the same time, 50% of the vehicles may be in wirelessly accessible locations on any given night. It may be determined that four PLP1 broadcasts will reach 65% of the vehicles (because of variants in which are garaged and which are accessible). Additional PLP1 broadcasts may be deemed not to reach many more vehicles, because the remainder are more consistently garaged during the relevant time periods and/or are more commonly in motion. Accordingly, several PLP0 broadcasts may also be scheduled, which can reach the moving vehicles, and scheduled at times when they are most likely to reach the most moving vehicles, to attempt to maximize penetration. This may be projected to reach a total of 85% of the vehicles between the two types of broadcast, removing redundancy, and that may be a suitable result.

Even though PLP0 broadcasts may be able to reach both stationary and moving vehicles, they may take longer, be less efficient, and still may not reach desired penetration. For example, in the preceding example, the garaged vehicles may all commute, when not garaged, to locations outside the range of the ATSC broadcast. Doing a PLP0 broadcast at night will not be as efficient, because most vehicles are not moving, so it would be more reasonable to do the PLP1 broadcast at night and a PLP0 broadcast during a commute time to maximize likelihood of efficiently reaching a vehicle within the target broadcast area. That is, some number of vehicles in a region may only be commonly reachable at times when the PLP1 (higher data, lower robustness) broadcast makes more sense, and some number may only be reachable at times when they are moving, requiring the PLP0 broadcast. Thus, adaptively and dynamically scheduling the PLP broadcasts to meet the movement profiles of the vehicles or target vehicles within the broadcast region is a reasonable and useful approach.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   one or more processors configured to:
   broadcast a vehicle state query to a plurality of vehicles within an ATSC broadcast radius associated with an ATSC transmission point, at a plurality of different time windows over a plurality of days;
   receive responses to the state query indicating vehicle state data, including at least vehicle motion data;
   aggregate the data to determine a first plurality of the time windows when a predefined threshold number of vehicles are present within the broadcast radius and are not stationary for at least a predetermined contiguous amount of time during a given time window of the first plurality;
   aggregate the data to determine a second plurality of the time windows when a predefined threshold number of vehicles are present within the broadcast radius and are stationary for at least a predetermined contiguous amount of time during a given time window of the second plurality;
   determine ones of the first plurality and second plurality of time windows projected to result in completed delivery above a predefined threshold percentage of a vehicle software update designated for broadcast, the ones chosen for delivering the update to the threshold percentage as quickly as possible with higher data rate transmission relative to other ones of the first plurality and second plurality of time windows; and
   automatically instruct the ATSC transmission point to broadcast the vehicle software update during the determined ones of the first and second plurality of time windows.

2. The system of claim 1, wherein the one or more processors are further configured to broadcast the query through instruction to the ATSC transmission point to broadcast the query.

3. The system of claim 1, wherein the one or more processors are further configured to receive responses to the state query from individual vehicles over a cellular connection.

4. The system of claim 1, wherein the motion data includes spot-data indicating motion data at the moment the query was received by a given responding vehicle.

5. The system of claim 1, wherein the motion data includes motion data over a time period associated with the query indicating motion data over the time period.

6. The system of claim 1, wherein the predetermined contiguous amount of time is determined based on an amount of time required to transmit and receive the vehicle software update at a stationary vehicle receiving an ATSC broadcast configured to be optimized for stationary vehicles.

7. The system of claim 1, wherein the one or more processors are further configured to:
   determine, based on feedback from a plurality of reporting vehicles delivered to the one or more processors, whether the delivery to the threshold percentage was achieved by the broadcast during the ones of the first and second plurality of time windows;
   responsive to the threshold percentage not being achieved, determine at least one cause of non-reception for a plurality of vehicles not receiving the update based on state data of the plurality of vehicles not receiving the update, reported by the plurality of vehicles not receiving the update, the state data being state data during one or more of the ones of the first and second plurality of time windows; and
   modify an assessment process, used to determine the ones of the first plurality and second plurality of time windows projected to result in completed delivery above the predefined threshold percentage, based on the determined at least one cause to increased accounting for a likelihood of the at least one cause by the assessment process.

8. A method comprising:
broadcasting a vehicle state query to a plurality of vehicles within an ATSC broadcast radius associated with an ATSC transmission point, at a plurality of different time windows over a plurality of days;
receiving responses to the state query indicating vehicle state data, including at least vehicle motion data;
aggregating the data to determine a first plurality of the time windows when a predefined threshold number of vehicles are present within the broadcast radius and are not stationary for at least a predetermined contiguous amount of time during a given time window of the first plurality;
aggregating the data to determine a second plurality of the time windows when a predefined threshold number of vehicles are present within the broadcast radius and are stationary for at least a predetermined contiguous amount of time during a given time window of the second plurality;
determining ones of the first plurality and second plurality of time windows projected to result in completed delivery above a predefined threshold percentage of a vehicle software update designated for broadcast, the ones chosen for delivering the update to the threshold percentage as quickly as possible with higher data rate transmission relative to other ones of the first plurality and second plurality of time windows; and
automatically instructing the ATSC transmission point to broadcast the vehicle software update during the determined ones of the first and second plurality of time windows.

9. The method of claim 8, the broadcasting further comprising broadcasting the query through instruction to the ATSC transmission point to broadcast the query.

10. The method of claim 8, the receiving further comprising receiving responses to the state query from individual vehicles over a cellular connection.

11. The method of claim 8, wherein the motion data includes spot-data indicating motion data at the moment the query was received by a given responding vehicle.

12. The method of claim 8, wherein the motion data includes motion data over a time period associated with the query indicating motion data over the time period.

13. The method of claim 8, wherein the predetermined contiguous amount of time is determined based on an amount of time required to transmit and receive the vehicle software update at a stationary vehicle receiving an ATSC broadcast configured to be optimized for stationary vehicles.

14. The method of claim 8, further comprising:
determining, based on feedback from a plurality of reporting vehicles, whether the delivery to the threshold percentage was achieved by the broadcast during the ones of the first and second plurality of time windows;
responsive to the threshold percentage not being achieved, determining at least one cause of non-reception for a plurality of vehicles not receiving the update based on state data of the plurality of vehicles not receiving the update, reported by the plurality of vehicles not receiving the update, the state data being state data during one or more of the ones of the first and second plurality of time windows; and
modifying an assessment process, used to determine the ones of the first plurality and second plurality of time windows projected to result in completed delivery above the predefined threshold percentage, based on the determined at least one cause to increased accounting for a likelihood of the at least one cause by the assessment process.

15. A system comprising:
one or more processors configured to:
broadcast a vehicle state query to a plurality of vehicles, for which a vehicle software update, designated for ATSC broadcast, applies, the plurality of vehicles within an ATSC broadcast radius associated with an ATSC transmission point, the vehicle state query broadcast at a plurality of different time windows over a plurality of days;
receive responses to the state query indicating vehicle state data, including at least vehicle motion data;
aggregate the data to determine a first plurality of the time windows when a predefined threshold number of vehicles are present within the broadcast radius and are not stationary for at least a predetermined contiguous amount of time during a given time window of the first plurality;
aggregate the data to determine a second plurality of the time windows when a predefined threshold number of vehicles are present within the broadcast radius and are stationary for at least a predetermined contiguous amount of time during a given time window of the second plurality;
determine ones of the first plurality and second plurality of time windows projected to result in completed delivery above a predefined threshold percentage of the vehicle software update, the ones chosen for delivering the update to the threshold percentage as quickly as possible with higher data rate transmission relative to other ones of the first plurality and second plurality of time windows; and
automatically instruct the ATSC transmission point to broadcast the vehicle software update during the determined ones of the first and second plurality of time windows.

16. The system of claim 15, wherein the one or more processors are further configured to broadcast the query through instruction to the ATSC transmission point to broadcast the query, the query including a designation usable by receiving vehicles to determine whether to respond to the query based on applicability of the software update.

17. The system of claim 15, wherein the one or more processors are further configured to broadcast the query through direct communication with the plurality of vehicles in the broadcast radius, the plurality of vehicles determined based on a current software state of a given of the plurality of vehicles being suitable for upgrade by the update.

18. The system of claim 15, wherein the motion data includes spot-data indicating motion data at the moment the query was received by a given responding vehicle.

19. The system of claim 15, wherein the motion data includes motion data over a time period associated with the query indicating motion data over the time period.

20. The system of claim 15, wherein the predetermined contiguous amount of time is determined based on an amount of time required to transmit and receive the vehicle software update at a stationary vehicle receiving an ATSC broadcast configured to be optimized for stationary vehicles.

* * * * *